(12) United States Patent
Cole

(10) Patent No.: US 8,177,453 B2
(45) Date of Patent: May 15, 2012

(54) MECHANICAL BALL JOINT FOR FINISHING TOOLS

(76) Inventor: Michael Cole, Minden, NV (US)

( * ) Notice: Subject to any disclaimer, the term of this patent is extended or adjusted under 35 U.S.C. 154(b) by 189 days.

(21) Appl. No.: 11/890,754

(22) Filed: Aug. 8, 2007

(65) Prior Publication Data

US 2009/0041536 A1  Feb. 12, 2009

(51) Int. Cl.
*F16C 11/00* (2006.01)
(52) U.S. Cl. ......... 403/122; 403/315; 403/316; 403/324
(58) Field of Classification Search .................. 403/122, 403/263, 315, 316, 319, 324
See application file for complete search history.

(56) References Cited

U.S. PATENT DOCUMENTS

| | | | | |
|---|---|---|---|---|
| 2,021,241 | A * | 11/1935 | Mall | |
| 2,626,821 | A * | 1/1953 | Bouget et al. ................. | 403/106 |
| 3,463,523 | A * | 8/1969 | Vasas Peter ................... | 403/263 |
| 4,091,640 | A * | 5/1978 | Olkowski et al. | |
| 4,116,604 | A * | 9/1978 | Johnson et al. | |
| 4,527,925 | A * | 7/1985 | Bauer et al. ................... | 403/319 |
| 4,767,297 | A * | 8/1988 | Mower et al. | |
| 5,472,254 | A * | 12/1995 | Wander ......................... | 403/319 |
| 6,964,323 | B2 * | 11/2005 | Campbell | |
| 7,114,869 | B2 * | 10/2006 | MacMillan .................... | 403/144 |
| 2005/0005386 | A1 * | 1/2005 | MacMillan .................... | 15/245.1 |
| 2005/0106278 | A1 * | 5/2005 | Hall et al. ....................... | 425/87 |

OTHER PUBLICATIONS

U.S. Appl. No. 10/714,005, filed Nov. 14, 2003, Hall et al.

* cited by examiner

*Primary Examiner* — Victor MacArthur
(74) *Attorney, Agent, or Firm* — Justin Lampel

(57) ABSTRACT

The present invention generally relates to a mechanical ball joint assembly which is particularly useful in finishing tools. The finishing tools may be used, for example, to prepare drywall surfaces for decorating and/or painting. The mechanical ball joint assembly may allow a body casting of the finishing tool to rotate in almost any direction with respect to ball joint and handle portion of the finishing tool. As a result, the body casting may be used to perform work on the drywall at many different angles, including ninety degree angles at the corners of most rooms. An opening in the ball joint assembly of the finishing tool may secure a ball joint portion by, for example, a moveable securing rod having an indentation. The movable securing rod of the ball joint assembly may allow the user to temporarily secure the ball joint within the opening of the ball joint assembly. The movable securing rod is spring-loaded to secure the ball joint within the opening of the ball joint assembly. The ball joint may be removed from the opening of the ball joint assembly to, for example, clean, replace, repair, store or transport the finishing tool.

4 Claims, 5 Drawing Sheets

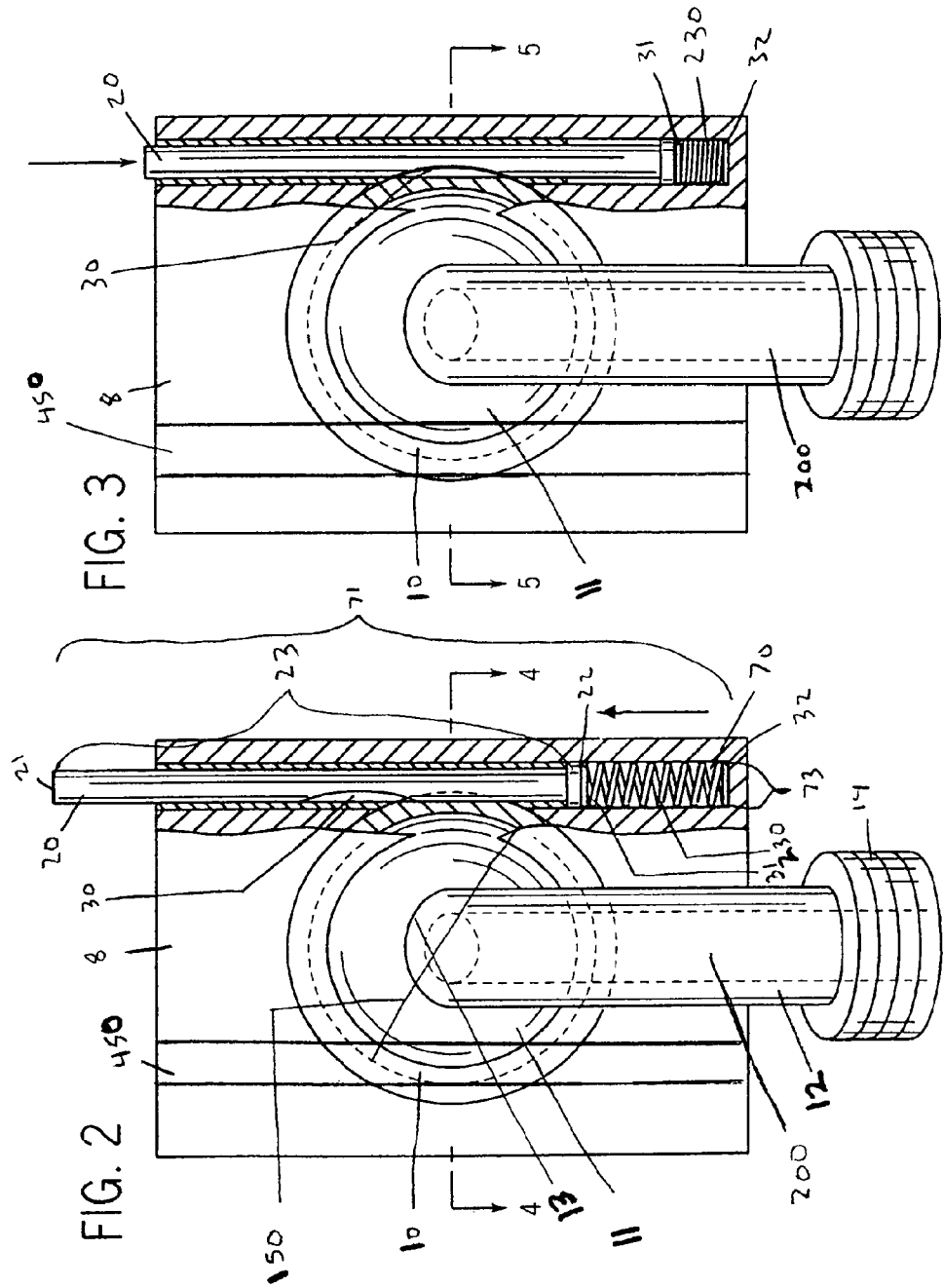

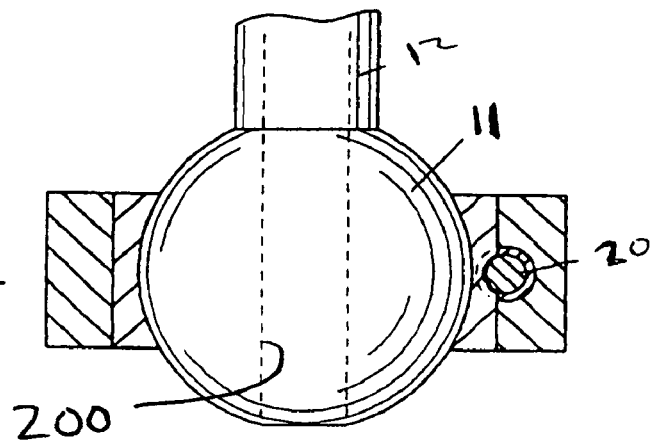
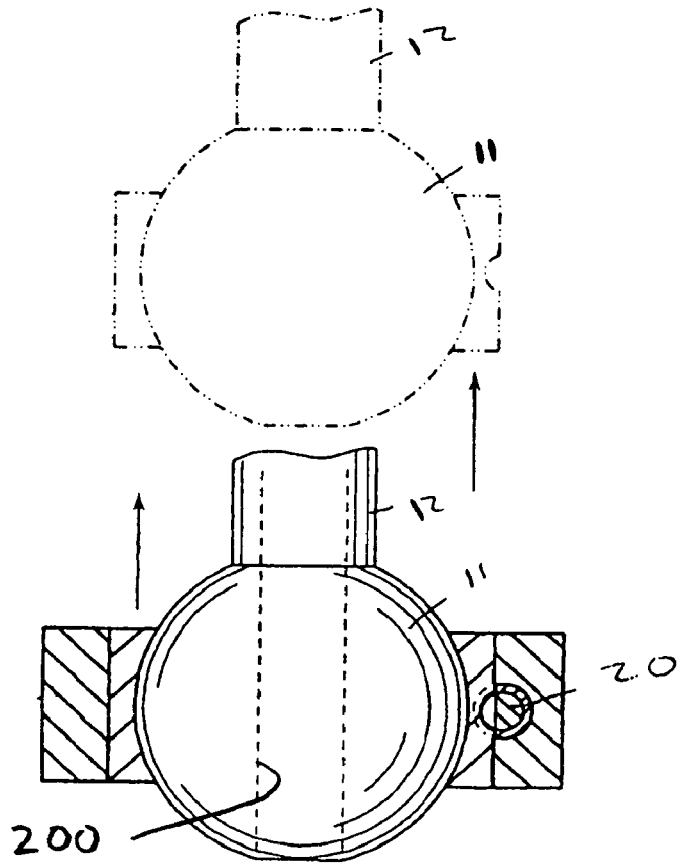

MECHANICAL BALL JOINT FOR FINISHING TOOLS

BACKGROUND OF THE INVENTION

The present invention generally relates to a mechanical ball joint assembly which is particularly useful in finishing tools. The finishing tools may be used, for example, to prepare drywall surfaces for decorating and/or painting. The mechanical ball joint assembly may allow a body casting of the finishing tool to rotate in almost any direction with respect to ball joint and handle portion of the finishing tool. As a result, the body casting may be used to perform work on the drywall at many different angles, including ninety degree angles at the corners of most rooms. An opening in the ball joint assembly of the finishing tool may secure a ball joint portion by, for example, a moveable securing rod having an indentation. The movable securing rod of the ball joint assembly may allow the user to temporarily secure the ball joint within the opening of the ball joint assembly. The movable securing rod is spring-loaded to secure the ball joint within the opening of the ball joint assembly. The ball joint may be removed from the opening of the ball joint assembly to, for example, clean, replace, repair, store or transport the finishing tool.

Drywall is generally produced in large board segments. To install the drywall within a building the drywall is generally cut and then fastened with nails or screws onto the studs in the room. Because many pieces of drywall are required to cover the interior surface of a room, there will often be some open joints between drywall boards which need to be sealed and smoothed. To cover these open joints, drywall tape is placed over the open joints and a drywall finishing tool is used to apply mud to smooth out the joints and tape. Next, sanding may be required to further smooth the surface of the drywall. Finally, paint or wallpaper is often applied over the drywall to give the room a clean look.

Drywall is generally installed either vertically or horizontally depending on which layout will produce the fewest number of open joints which require sealing. Sealing the corner joints in drywall is often difficult. As a result, numerous tools have been invented to make the process faster and easier.

For example, U.S. Pat. No. 7,114,869 to MacMillan discloses a drywall tool that employs rotatable joints, e.g., ball joints, and methods of using such tools. One particular implementation of a drywall tool includes a body having a recess adapted to pivotably receive a rounded connector of a handle. A retainer carried by the body includes first and second rods. Each of the rods is rotatable about an axis and has a non-uniform circumference with respect to that axis such that a surface of the rod is spaced farther from a recess axis of the recess when in its open position than when in its closed position.

U.S. Pat. No. 4,767,297 to Mower et al. discloses a corner finishing tool having means to contain a supply of mastic and having generally perpendicular means defining a corner with wear pads.

Further, U.S. Pat. No. 6,155,809 to Edwards et al. discloses an applicator head for receiving and distributing viscous mass to a surface corner comprising a chassis engagable with a source of viscous mass and a trowel assembly carried by the chassis for receiving viscous mass from the chassis and distributing the viscous mass against a surface corner, the trowel assembly comprising an angularly flexible housing and elongate blades carried by the angularly flexible housing for movement in pivotal and reciprocal directions in response to angular flexing of the angularly flexible body.

However, these existing devices fail to provide the benefits of the present invention. More specifically, theses existing devices fail to provide a finishing tool for drywall which has a mechanical ball joint which resists becoming damaged and/or clogged with tape and/or mud. Further, the ball joint of the present invention has fewer moving parts than existing ball joints for finishing tools and, therefore, is resistant to wear and tear. Finally, the ball joint of the present invention is easier to clean than existing attachment mechanisms of finishing tools.

A need, therefore, exists for an improved apparatus for securing a handle of a compound applicator to a finishing tool. More specifically, a need exists for an improved finishing tool having a ball joint assembly which temporarily secures a ball within an opening in a quick and efficient manner.

SUMMARY OF THE INVENTION

The present ball joint assembly generally relates to a mechanical ball joint assembly which is particularly useful in finishing tools. The finishing tools may be used, for example, to prepare drywall surfaces for decorating and/or painting. The mechanical ball joint assembly may allow a body casting of the finishing tool to rotate in almost any direction with respect to ball joint and handle portion of the finishing tool. As a result, the body casting may be used to perform work on the drywall at many different angles, including ninety degree angles at the corners of most rooms. An opening in the ball joint assembly of the finishing tool may secure a ball joint portion by, for example, a moveable securing rod having an indentation. The movable securing rod of the ball joint assembly may allow the user to temporarily secure the ball joint within the opening of the ball joint assembly. The movable securing rod is spring-loaded to secure the ball joint within the opening of the ball joint assembly. The ball joint may be removed from the opening of the ball joint assembly to, for example, clean, replace, repair, store or transport the finishing tool.

An advantage of the present ball joint assembly is to provide a mechanical ball joint assembly for a finishing tool wherein the ball joint assembly temporarily secures a ball joint for attaching and/or rotation of a handle of a compound applicator.

An advantage of the present ball joint assembly is to provide a mechanical ball joint assembly for a finishing tool wherein the ball joint assembly is easy to clean.

Another advantage of the present ball joint assembly is to provide a mechanical ball joint assembly for a finishing tool wherein the ball joint assembly is resistant to damage.

A further advantage of the present ball joint assembly is to provide a mechanical ball joint assembly for a finishing tool wherein the ball joint assembly may be easily dissembled.

And an advantage of the present ball joint assembly is to provide a mechanical ball joint assembly for a finishing tool wherein a single movable rod may secure the ball joint within the opening of the ball joint assembly.

Still another advantage of the present ball joint assembly is to provide a mechanical ball joint assembly for a finishing tool wherein the ball joint assembly provides consistent pressure for the finishing tool to perform work on drywall.

Yet another advantage of the present ball joint assembly is to provide a mechanical ball joint assembly for a finishing tool wherein the ball joint assembly provides a consistent angle for the finishing tool to be used on the drywall. More specifically, the ball joint assembly allows the finishing tool to consistently adapt to almost any required angle while work is preformed on the drywall.

For a more complete understanding of the above listed features and advantages of the mechanical ball joint assembly for a finishing tool, reference should be made to the following detailed description of the preferred embodiments and to the accompanying drawings. Further, additional features and advantages of the present ball joint assembly are described in, and will be apparent from, the detailed description of the preferred embodiments and from the drawings.

BRIEF DESCRIPTION OF THE DRAWINGS

FIG. 2 illustrates a front plan view of the housing of the ball joint assembly wherein a securing bar is in a first position.

FIG. 3 illustrates a front plan view of the housing of the ball joint assembly wherein the securing bar is in a second position.

FIG. 4 illustrates a top plan view of the ball joint in the housing of the ball joint assembly.

FIG. 5 illustrates a top plan view of the ball joint in the housing of the ball joint assembly.

DETAILED DESCRIPTION OF THE PREFERRED EMBODIMENTS

The present invention generally relates to a mechanical ball joint assembly which is particularly useful in finishing tools. The finishing tools may be used, for example, to prepare drywall surfaces for decorating and/or painting. The mechanical ball joint assembly may allow a body casting of the finishing tool to rotate in almost any direction with respect to ball joint and handle portion of the finishing tool. As a result, the body casting may be used to perform work on the drywall at many different angles, including ninety degree angles at the corners of most rooms. An opening in the ball joint assembly of the finishing tool may secure a ball joint portion by, for example, a moveable securing rod having an indentation. The movable securing rod of the ball joint assembly may allow the user to temporarily secure the ball joint within the opening of the ball joint assembly. The movable securing rod is spring-loaded to secure the ball joint within the opening of the ball joint assembly. The ball joint may be removed from the opening of the ball joint assembly to, for example, clean, replace, repair, store or transport the finishing tool.

Figure 1:
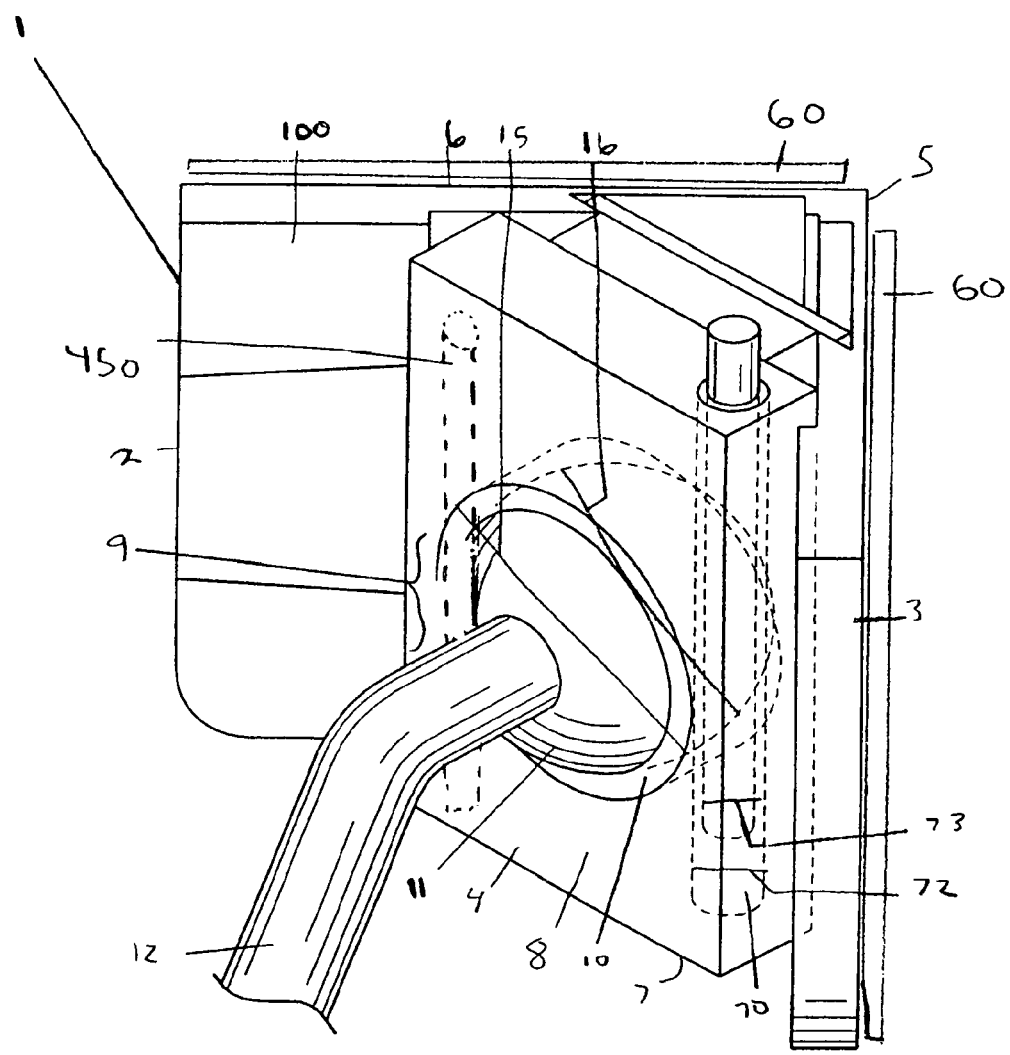
FIG. 1 illustrates a side perspective view of a ball joint assembly for a finishing tool wherein the ball joint assembly has a ball joint locked into place.

Referring now to the drawings wherein like numerals refer to like parts, FIG. 1 generally illustrates a finishing tool 1 having a first side 2, a second side 3, a front 4, a back 5, a top 6, a bottom 7, a housing 8 and a body casting 100. The body casting 100 may simply be the portion of the finishing tool 1. The first side 2 and the second side 3 may be generally flat surfaces and may be generally perpendicular to each other. It should be noted that a finishing tool 1 having a first side 2 and a second side 3 meeting at any angle aside from ninety degrees may be used. The housing 8 of the finishing tool 1 may have an opening 10 which may act as a portion of a ball joint assembly 9. More specifically, the opening 10 of the housing 8 may receive a ball joint 11 which may be attached to a handle 12. The finishing tool 1 and the ball joint 11 are preferably made from a metal, however, any suitable material may be used to achieve its desired function. In an embodiment, the opening 10 is circular.

The opening 10 of the housing 8 of the finishing tool 1 may have a diameter 15 which may be slightly larger than a diameter 16 of the ball joint 11. As a result, the ball joint 11 may be snugly held into the opening 10 of the housing 8 of the finishing tool 1. Further, while the ball joint 11 is located within the opening 10 of the housing 8 of the finishing tool 1, the ball joint 11 may freely rotate in almost any direction.

Referring now to FIG. 2, the housing 8 of the finishing tool 1 may have a securing bar 20 for securing the ball joint 11 within the opening 10 of the finishing tool 1. The securing bar 20 may have a top side 21, a bottom side 22 and a length 23. The securing bar 20 is preferably generally cylindrical in shape, but in alternative embodiments may also be generally rectangular or any other suitable shape. An indentation 30 may be present on the securing bar 20. Preferably, the indentation 30 may be generally arch shaped so as to mirror the shape of a portion of the circumference of the ball joint 11 and further mirror the shape of the circumference of the opening 10. A second securing bar 450 may be used to secure the ball joint 11 within the opening 10 of the finishing tool 1 (as discussed below). The second securing bar 450 may not have an indentation and may be located on the opposite side of the opening 10 of the finishing tool 1 as the securing bar 20 having the indentation 30 so as to stabilize the ball joint 11 within the opening 10 of the finishing tool 1.

Figure 7:
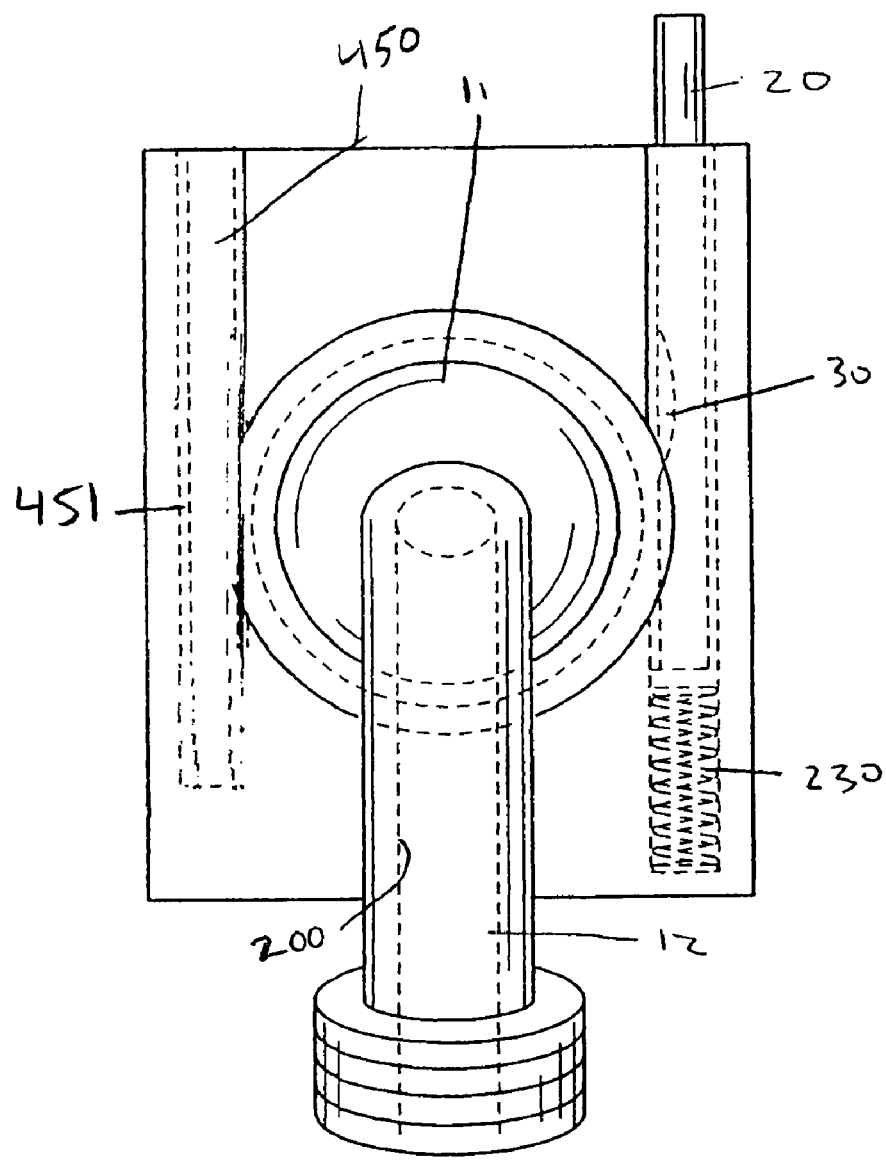
FIG. 7 illustrates a front plan view of the housing of the present ball joint assembly wherein a second securing bar is stationary.

The housing 8 may have an interior having a first hollow opening column 70 (described below), a second hollow opening column 451 (FIG. 7) and the opening 10 for receiving the ball joint 11. The second securing bar 450 may be located within the second hollow opening column 451 of the housing 8 and the first securing bar 20 may be located within the first hollow opening column 70 of the housing 8.

As illustrated in FIGS. 2 and 3, the second securing bar 450 may be located completely within the housing 8 of the finishing tool 1 such that only the portion of the second securing bar 450 which extends into the circumference 150 of the opening 10 of the housing 8 of the finishing tool 1 is visible to the user. As a result, the second securing bar 450 is protected and provides additional support to the ball joint 11 to secure the ball joint 11 into the opening 10 of the housing 8.

As illustrated in FIGS. 2 and 3, the securing bar 20 of the device moves directly upward and downward with respect to the housing 8 of the finishing tool 1. More specifically, the top side 21 of the securing bar 20 moves only up or down with respect to the top 6 of the finishing tool 1.

The ball joint 11 of the finishing tool 1 may be secured to, for example, a handle 12 having a first end 13 and a second end 14. As a result, as the handle 12 is moved with respect to the body casting 100, the ball joint 11 may freely rotate within the opening 10 of the housing 8 of the finishing tool 1. Because the first end 13 of the handle 12 is connected to the ball joint 11, the rotation of the ball joint 11 within the opening 10 of the housing 8 may be limited with respect to the surface area in which the handle 12 is attached to the ball joint 11.

Referring again to FIG. 1, a plurality of blades 60 may be attached to the finishing tool 1 to, for example, smooth out the mud and or tape of the drywall. The blades 60 of the finishing tool 1 may be generally attached to independent frames near the top 6 of the body casting 100. Further, the blades 60 may be used to evenly apply the mud onto the drywall.

Referring now to FIGS. 2 and 3, a first hollow opening column 70 may be located within the housing 8 of the body casting 100, near the opening 10. The first hollow opening column 70 may have a length 71 and a diameter 72. The diameter 72 of the first hollow opening column 70 may be slightly larger than a diameter 73 of the securing bar 20 such that the securing bar 20 may fit snugly within the first hollow opening column 70. The securing bar 20 of the finishing tool 1 may be largely located within the first hollow opening column 70 of the housing 8. The first hollow opening column 70 may allow the securing bar 20 to move vertically within the housing 8.

A spring 230 may be located within the first hollow opening column 70. The spring 230 may have a first end 31 and a second end 32. The first end 31 of the spring 230 may be secured to the bottom end of the first hollow opening column 70 and the second end 32 of the spring 230 may be secured to the bottom side 22 of the securing bar 20 such that the spring 230 remains hidden and secured within the first hollow opening column 70. The spring 230 may also be attached to and secured the securing bar 20 within the first hollow opening column 70.

The top side 21 of the securing bar 20 may extend outside the first hollow opening column 70 such that the top side 21 of the securing bar 20 is generally outside the first hollow opening column 70 at all times while the bottom side 22 of the securing bar 20 generally remain inside the first hollow opening column 70 at all times. As a result, a user may always access the top side 21 of the securing bar 21.

The securing bar 20 may be moved from a first position A (FIG. 2) to a second position B (FIG. 3). In the first position A, the securing bar 20 may be forced upward by the spring 230. Further, in the first position A, the top side 21 of the securing bar 20 may be manually pushed down so that a larger portion of the securing bar 20 is forced down into the first hollow opening column 70. When the top side 21 of the securing bar 20 is pushed down, the spring 230 may be compressed and the securing bar 20 may be moved from the first position A into the second position B. The securing bar 20 may remain in the second position B only when a constant force is applied to the top side 21 of the securing bar 20. When the force applied to the securing bar 20 is released, the spring 230 may expand and force the securing bar 20 upward and back to the first position A.

A portion of the first hollow opening column 70 may be located within a circumference 150 of the opening 10 of the housing 8 of the finishing tool 1. As a result, a portion of the securing bar 20 may cover a portion of the opening 10 of the housing 8 of the finishing tool 1 when the securing bar 20 is in position A. Further, when the ball joint 11 is secured within the opening 10, the top side 21 of the securing bar 20 is generally in the second position A.

When the top side 21 of the securing bar 20 is manually forced downward to move the securing bar 20 into the second position B, the indentation 30 on the securing bar 20 is likewise moved downward along with the securing bar 20 so that the indentation 30 substantially lines up with the opening 10 of the housing 8 of the finishing tool 1. As a result, when the securing bar 20 is in the second position B, the securing bar 20 does not cover a portion of the opening 10 of the housing 8 of the finishing tool 1. When in the second position B, the ball joint 11 may be inserted into the opening 10 of the housing 8 of the finishing tool 1. Once the ball joint 11 is in the opening 10, the force applied to the top side 21 of the securing bar 20 may be released and the spring 230 may force the securing bar 20 upward toward the first position A. In the first position A, a portion of the securing bar 20 may cover the portion of the opening 10 and, therefore, prevent the ball joint 11 from being removed from the opening 10 of the housing 8 of the finishing tool 1. In this position, the ball joint 11 and handle 12 are secured to the body casting 100 and the user may use the finishing tool 1 to perform work.

To release the ball joint 11 from the opening 10 of the housing 8 of the finishing tool 1, the user may press down on the top side 21 of the securing bar 20 so that the indentation 30 of the securing bar 20 lines up with the opening 10 and a portion of the securing bar 20 no longer covers a portion of the opening 10. The ball joint 11 may then be removed from the opening 10 to, for example, ship, store and/or clean the finishing tool 1. Likewise, the user may press down on the top side 21 of the securing bar 20 to move the securing bar into the second position B to install the ball joint 11 into the opening 10 of the housing 8 to perform work.

A fluid delivery device 200 may be similarly attached within the handle 12 portion of the finishing tool 1 so that fluid, such as mud, needed for the drywall may pass through the handle 12, through the ball joint 11 and through the body casting 100 and applied to the wall. The ball joint 11 of the present invention allows the user to apply the mud at a consistent pressure and at a consistent angle on the drywall. The user may remove the ball joint 11 and handle 12 from the housing 8 of the body casting 100 to insert the ball joint 11 and handle 12 onto a different body casting 100. For example, a separate body casting 100 may be used for different drywall or for rooms having drywall with unique shapes.

As illustrated in FIGS. 4 and 5, the fluid delivery device 200 of the present finishing tool 1 extends from the handle 12 through the ball joint 11 so that the fluid (such as mud) may pass completely through both the handle 12 and the ball joint 11. The dotted-lines of FIGS. 4 and 5 illustrate the passageway for the fluid through the fluid delivery device 200.

Figure 6:
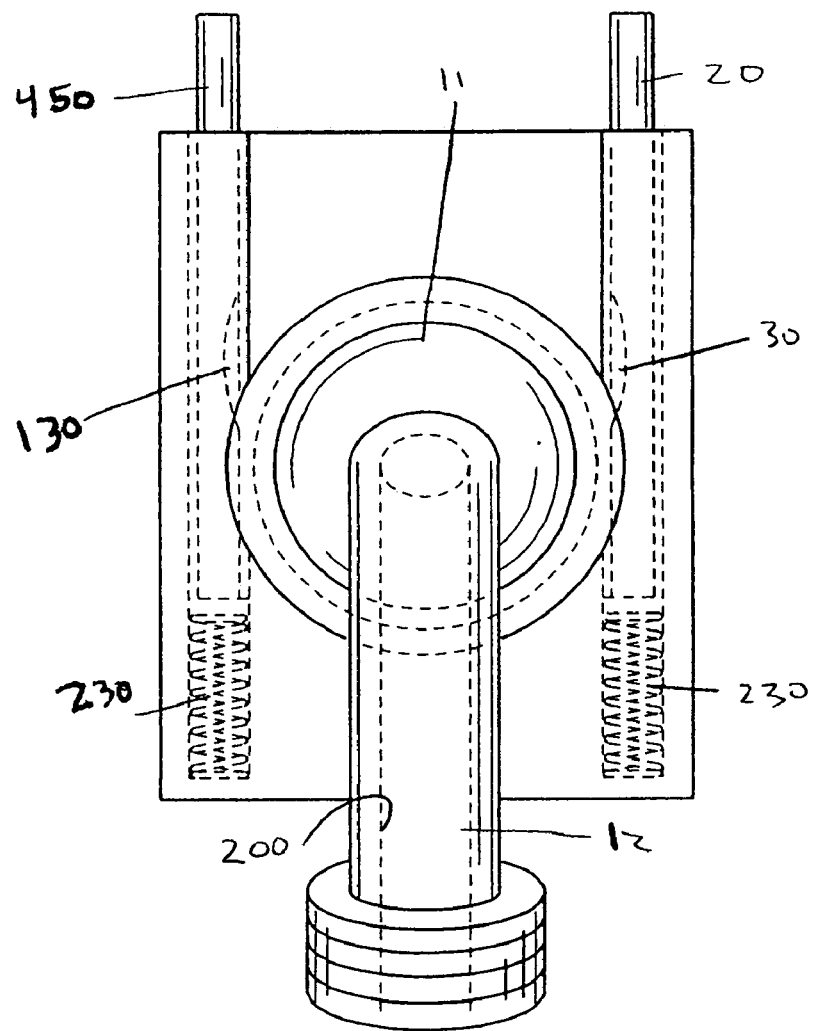
FIG. 6 illustrates a front plan view of the housing of the present ball joint assembly having two securing bars.

In an embodiment, a second securing bar 450 (FIGS. 6 and 7) may be located near the top side of the housing 8, preferably on the opposite side of the opening 10 as the first securing bar 20. The second securing bar 450 may be stationary (FIG. 7) or may move (FIG. 6) similar to the first securing bar 20. For example, if the second securing bar 450 is stationary (FIG. 7), the second securing bar 450 may simply act to help prevent the ball joint 11 from exiting the opening 10 of the housing 8 while the first securing bar 20 is in the first position A and the ball joint 11 is locked into the opening 10.

In the embodiment wherein the second securing bar 450 is stationary, the second securing bar 450 remains in direct contact with the ball joint 11 while the ball joint 11 is located inside the opening 10 of the housing 8. As a result, (stationary) second securing bar 450 prevents the ball joint 11 from exiting the opening 10 of the housing 8. Further, the second securing bar 450 is located on substantially the opposite side of the opening 10 of the housing 8 as the first securing bar 20.

In an embodiment, the second securing bar 450 may also have an indentation 130 similar to the indentation 30 of the first securing bar 20. In this embodiment, the second securing bar 450 may also move from a first position to a second position in much the same way as the first securing bar 20 moves form the first position A to the second position B. As a result, the ball joint 11 would slide past the indentation 30 on the first securing bar 20 and the indentation 130 on the second securing bar 450 when the ball joint 11 is inserted or removed from the opening 10 of the housing 8. Having more than one securing bar may decrease the chances of the ball joint 11 accidentally becoming removed from the opening 10 of the housing 8.

Although embodiments of the present invention are shown and described therein, it should be understood that various changes and modifications to the presently preferred embodiments will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A ball joint assembly comprising:

a ball joint;

a housing having an interior having a first hollow cylindrical opening column, a second hollow cylindrical opening column and a top side and further having a circular opening having a circumference wherein the circular opening receives the ball joint wherein the ball joint is partially located within the circular opening of the housing:

a movable securing bar located within the first hollow cylindrical opening column of the housing wherein the movable securing bar has an indentation having an arch wherein the movable securing bar has a first end and a second end wherein the arch is located between the first end and the second end and wherein the second end is completely located within the first hollow cylindrical opening and wherein the first end of the movable securing bar extends beyond the top side of the housing;

a second securing bar having a first end and a second end wherein the first end and the second end of the second securing bar are located completely within the second cylindrical hollow opening;

a spring located completely within the first hollow cylindrical opening column; and wherein the movable securing bar is moved vertically from a first position to a second position with respect to the circular opening of the housing and wherein the indentation of the movable securing bar correspondingly moves from a first position to a second position with respect to the circular opening of the housing and wherein the movable securing bar at least partly covers a portion of the circumference of the circular opening of the housing in the first position and wherein the arch of the indentation of the movable securing bar substantially lines up with the circumference of the circular opening of the housing in the second position.

2. The ball joint assembly of claim 1 wherein the ball joint has an interior passageway for a fluid to pass completely through.

3. The ball joint assembly of claim 1 wherein the second securing bar located within the second hollow opening column of the housing at least partly covers a portion of the circumference of the circular opening of the housing for receiving the ball joint wherein the second securing bar is stationary and directly contacts and prevents the ball joint from exiting the circular opening of the housing.

4. The ball joint assembly of claim 1 wherein the first hollow cylindrical opening column and second hollow cylindrical opening column are parallel with respect to each other and wherein the circular opening of the housing is located between the first hollow cylindrical opening column and the second hollow cylindrical opening column.

* * * * *